(12) United States Patent
Mori et al.

(10) Patent No.: US 8,065,066 B2
(45) Date of Patent: Nov. 22, 2011

(54) VEHICLE RUNNING CONTROL DEVICE FOR RUNNING EXTREMELY LOW SPEED TO STOP

(75) Inventors: Yukio Mori, Kariya (JP); Kazuhiro Kamiya, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 1196 days.

(21) Appl. No.: 11/491,878

(22) Filed: Jul. 25, 2006

(65) Prior Publication Data
US 2007/0027598 A1   Feb. 1, 2007

(30) Foreign Application Priority Data
Jul. 27, 2005   (JP) .................................. 2005-217010

(51) Int. Cl.
*B60T 8/00*   (2006.01)
*B60W 30/06*   (2006.01)

(52) U.S. Cl. ................ 701/70; 701/48; 701/93; 180/170

(58) Field of Classification Search ..................... 701/48, 701/70, 77, 78, 79, 83, 84, 87, 93; 180/170, 180/176, 177, 179
See application file for complete search history.

(56) References Cited

U.S. PATENT DOCUMENTS

| | | | |
|---|---|---|---|
| 5,701,062 A * | 12/1997 | Barrett | 318/51 |
| 6,435,625 B1 * | 8/2002 | Schwarz et al. | 303/20 |
| 2002/0171382 A1 * | 11/2002 | Tanner et al. | 318/280 |
| 2004/0085197 A1 * | 5/2004 | Watanabe et al. | 340/435 |
| 2004/0215385 A1 * | 10/2004 | Aizawa et al. | 701/93 |

FOREIGN PATENT DOCUMENTS

JP   A-2005-057962   3/2005

* cited by examiner

*Primary Examiner* — Khoi Tran
*Assistant Examiner* — Spencer Patton
(74) *Attorney, Agent, or Firm* — Posz Law Group, PLC

(57) ABSTRACT

A distance from a stopped position of a vehicle to a target parking position is determined as a set distance. The vehicle is then moved by gradually lowering a requisite braking force that includes an oscillating braking force. It is thus possible to run the engine-powered vehicle at an extremely low speed, regardless of whether a motor is provided.

7 Claims, 6 Drawing Sheets

VEHICLE RUNNING CONTROL DEVICE FOR RUNNING EXTREMELY LOW SPEED TO STOP

CROSS REFERENCE TO RELATED APPLICATION

This application is based upon and claims the benefit of Japanese Patent Application No. 2005-217010 filed on Jul. 27, 2005, the content of which are incorporated herein by reference.

FIELD OF THE INVENTION

The present invention relates to a vehicle running control device that is capable of running a vehicle at an extremely low speed (e.g., 0.1 to 0.2 km/h). More specifically, the present invention relates to a vehicle running control device that is capable of moving a vehicle at an extremely low speed so as to precisely move the vehicle a set minute distance and then stop the vehicle, in cases where a parking assist control has set a minute distance for movement on the order of a few centimeters to tens of centimeters.

BACKGROUND OF THE INVENTION

Parking assist controls for guiding a vehicle into a parking space or the like are in practical use. According to such parking assist control, the vehicle is run at a vehicle speed set by the driver in order to guide the vehicle into a location where the driver wants to park. Giving consideration to the vehicle's inertia and a response delay in hardware mechanisms that generate a braking force for stopping the vehicle, the vehicle must be run at an extremely low speed at this time.

To achieve this, Japanese Patent Application Publication No. JP-A-2005-57962 discloses a motor control device capable of running a vehicle at an extremely low speed. The motor control device controls a motor provided in an electric vehicle or the like, and runs the vehicle at an extremely low speed so as to enable movement of only a set minute distance.

However, the art disclosed in Japanese Patent Application Publication No. JP-A-2005-57962, where a motor is used to run a vehicle at an extremely low speed, can only be applied to vehicles equipped with a motor. Such art cannot be applied to vehicles running on engine power alone, which are the most popularized type of vehicle in use.

SUMMARY OF THE INVENTION

It is an object of the present invention to provide a vehicle running control device capable of running an engine-powered vehicle at an extremely low speed, regardless of whether a motor is provided.

According to a first aspect of the present invention, a vehicle running control device includes: a first calculation unit for calculating a driving force to be applied to vehicle wheels in a traveling direction of the vehicle and calculating a first braking force to be applied to the vehicle wheels in order to keep the vehicle stopping against the driving force; a detection unit for detecting a vehicle speed; a second calculation unit for calculating a first control torque that corresponds to the first braking force; and a torque application unit for applying a second control torque that is calculated by adding a third control torque oscillating every predetermined cycle to the first control torque to the vehicle wheels, such that the driving force becomes relatively greater than a second braking force applied to the vehicle wheels and the vehicle moves in the traveling direction.

in addition, the second calculation unit varies the second control torque when the vehicle is moved by an application of the second control torque, by varying at least one of the first control torque and the third control torque based upon the vehicle speed calculated by the detection unit, such that the vehicle speed is within a predetermined speed range.

By applying the second control torque for including the third control torque in this manner, the driving force becomes relatively greater than the second braking force applied to the vehicle wheels, whereby the vehicle can be moved in the traveling direction. At this time, the vehicle can be run at an extremely low speed when either the first control torque or the third control torque is varied such that the vehicle speed is within the predetermined speed range defined as an extremely low speed based upon the vehicle speed detected by the detection unit. Accordingly, it is possible to run the engine-powered vehicle at an extremely low speed, regardless of whether a motor is provided.

According to a second aspect of the present invention, for example, the detection unit can detect by calculating a moving distance of the vehicle within a set time that is set beforehand as the vehicle speed.

In this case, the vehicle speed can be set to an extremely low speed as follows. If the moving distance of the vehicle within the set time detected by the detection unit is less than a first predetermined value, then the second calculation unit varies the first control torque so as to increase a difference between the driving force and the second braking force applied to the vehicle wheels. If the moving distance exceeds a second predetermined value that is greater than the first predetermined value, then the second calculation unit varies the first control torque so as to decrease a difference between the driving force and the second braking force applied to the vehicle wheels.

According to a third aspect of the present invention, the torque application unit decreases an amplitude of the third control torque in accordance with increases in the moving distance of the vehicle within the set time calculated by the detection unit.

Thus, the amplitude of the third control torque decreases as the moving distance of the vehicle within the set time increases. It is therefore possible to converge the moving distance of the vehicle within the set time to an arbitrary distance, and keep the vehicle speed at an extremely low speed.

According to a fourth aspect of the present invention, an instruction unit determines a set distance that indicates how far to move the vehicle from a stopped location of the vehicle. In this case, the second calculation unit varies the first control torque so as to stop the vehicle at the set distance determined by the instruction unit.

Thus, in cases where a set distance is determined, such as when a target parking position is determined in a parking assist control, varying the first control torque makes it possible to move the vehicle at an extremely low speed for only the set distance and then stop the vehicle.

According to a fifth aspect of the present invention, for example, the second calculation unit calculates a sum of a value in which the vehicle speed detected by the detection unit is multiplied by a predetermined time, and the moving distance from the stopped location of the vehicle based upon the vehicle speed detected by the detection unit. In order to stop the vehicle when the sum is equal to or greater than the set distance, the second calculation unit may then vary the first control torque so as to eliminate a difference between the driving force and the second braking force applied to the vehicle wheels.

Note that a braking torque as indicated in a sixth aspect of the present invention is conceivable as the control torque. The torque application unit can decrease a required braking torque as the second control torque so that the driving force becomes relatively greater than the second braking force applied to the vehicle wheels.

In addition, a driving torque as indicated in a seventh aspect of the present invention can also be used as the control torque. The torque application unit can increase a required driving torque as the second control torque so that the driving force becomes relatively greater than the second braking force applied to the vehicle wheels.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
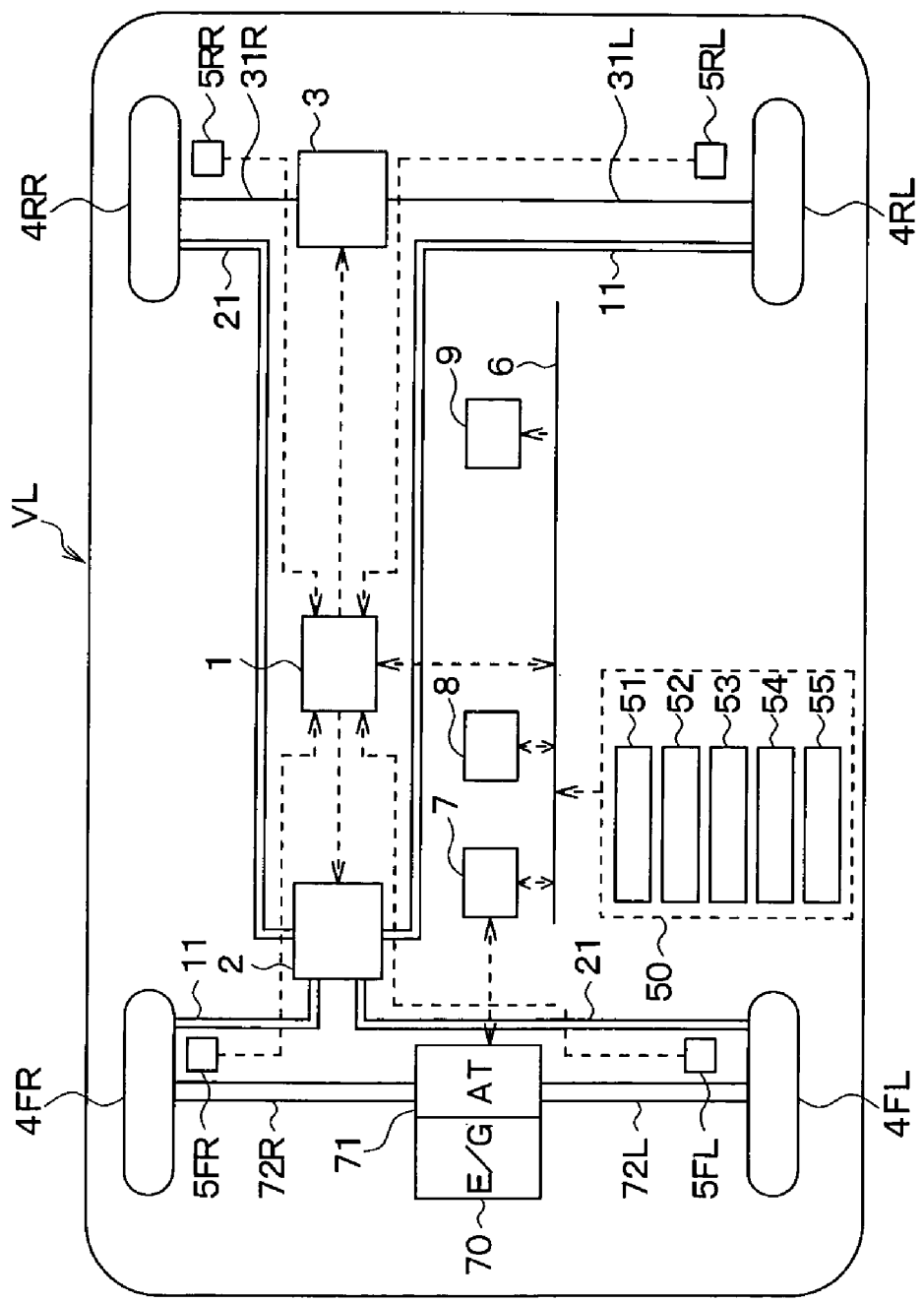
FIG. 1 is a block diagram showing a parking assist control system that is provided with a vehicle running control device according to a first embodiment of the present invention.

The present invention will be described further with reference to various embodiments in the drawings.

First Embodiment

A parking assist control system equipped with a vehicle running control device to which a first embodiment of the present invention is applied will now be described with reference to the drawings.

FIG. 1 is a diagram showing an overall configuration for a parking assist control system of the present embodiment. In the figure, a vehicle VL has a front left wheel, a front right wheel, a rear left wheel and a rear right wheel, whose corresponding structural elements are respectively denoted and represented as FL, FR, RL and RR.

The parking assist control system of the present embodiment has a configuration including a brake control ECU 1; a hydraulic brake device 2; an electric parking brake (hereinafter referred to as "PKB") 3; respective vehicle wheels 4FL, 4FR, 4RL, 4RR, each of which is equipped with wheel cylinders (hereinafter referred to as "W/C") 41FL, 41FR, 41RL, 41RR; vehicle wheel speed sensors 5FL, 5FR, 5RL, 5RR; an onboard LAN bus 6; an engine control ECU 7, a parking assist control ECU 8; a warning device 9; and various sensors 50.

Among the above structural elements, the brake control ECU 1, the engine control ECU 7, the parking assist control ECU 8, the warning device 9, and the sensors 50 are respectively connected to the onboard LAN bus 6, and are able to receive and send signals to one another via the onboard LAN bus 6.

The brake control ECU 1 is configured from a computer. Input to the brake control ECU 1 via the onboard LAN bus 6 are a braking request from the parking assist control ECU 8, and sensor signals from the respective vehicle wheel speed sensors 5FL to 5RR and the sensors 50. The brake control ECU 1 outputs drive signals for controlling the hydraulic brake device 2 and the PKB 3 described later, and also outputs a control signal to the engine control ECU 7.

Figure 2:
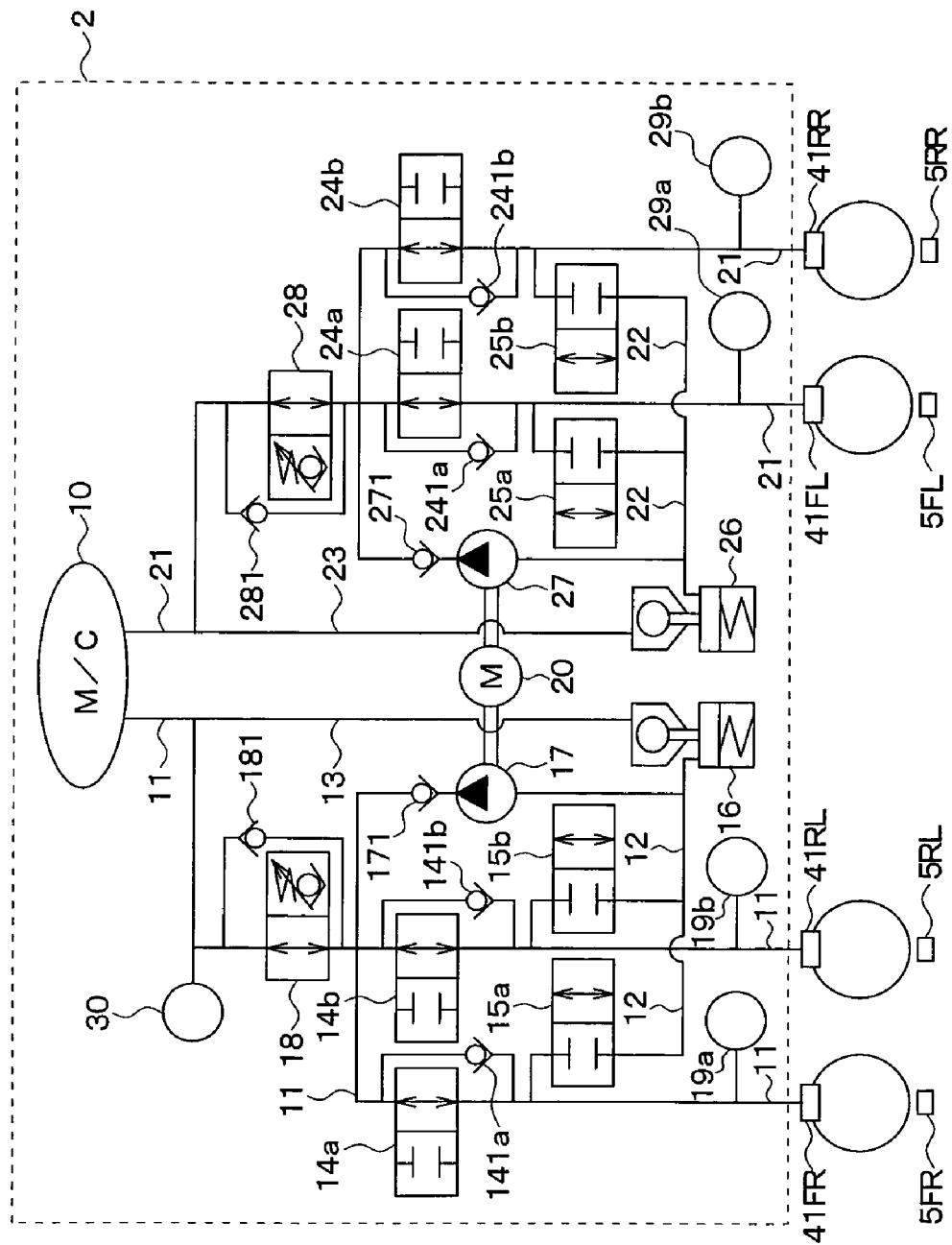
FIG. 2 is a diagram showing a specific piping configuration of a hydraulic brake device provided in the parking assist control system shown in FIG. 1.

The hydraulic brake device 2 corresponds to braking force application mechanism that applies a braking force to the respective vehicle wheels 4FL to 4RR. FIG. 2 is a diagram showing a specific piping configuration of the hydraulic brake device 2. The hydraulic brake device 2 will be described below with reference to FIG. 2.

When a brake pedal (not shown) is depressed by a driver, a master cylinder (hereinafter referred to as "M/C") 10 generates a M/C pressure corresponding to a depression force of the brake pedal as detected by a brake operation amount sensor 53 described later, which is included in the sensors 50. The M/C 10 is connected with a first brake system 11 and a second brake system 21, and the respective W/Cs 41FL to 41RR are diagonally connected to the respective brake systems 11, 12.

Brake fluid pressure generated by the M/C 10 is transmitted to the W/Cs 41FL to 41RR provided in the respective vehicle wheels, via the first brake system 11 and the second brake system 21, so as to generate a first braking force.

Hereinafter, the first brake system 11, in particular, a brake system related to the front right wheel 4FR, will be described. The second brake system and that for the other vehicle wheels are identical.

Provided in the first brake system 11 are pressure increase control valves 14a, 14b that respectively correspond to the front right wheel 4FR and the rear left wheel 4RL, and which control the pressure of the respective W/Cs 41FR, 41RL so as to maintain or increase the pressure during ABS control. The pressure increase control valves 14a, 14b are respectively provided with parallel check valves 141a, 141b. The check valves 141a, 141b allow fluid to escape to the M/C 10 side in case of excessive W/C pressure while the pressure increase control valves 14a, 14b are closed.

A pressure decrease conduit 12 extends between the pressure increase control valves 14a, 14b and the W/Cs 41FR, 41RL. Provided in the pressure decrease conduit 12 are pressure decrease control valves 15a, 15b, which control the pressure of the respective W/Cs 41FR, 41RL so as to maintain or decrease the pressure during the ABS control. The pressure decrease conduit 12 is connected to a reservoir 16.

Brake fluid accumulated in the reservoir 16 is sucked by a pump 17 that is driven by a motor 20 and subsequently returned to between the pressure increase control valves 14a, 14b and a master cut valve (hereinafter referred to as an "SM valve") 18 described later. Note that a discharge port of the pump 17 is provided with a check valve 171 such that high brake fluid pressure is not applied to the discharge port of the pump 17.

The SM valve 18 is disposed between the M/C 10 and the pressure increase control valves 14a, 14b. The SM valve 18 is a two position valve, which is being open state when a solenoid thereof is an energized and is closed state by a check valve in the direction shown in the figure when the solenoid thereof energized.

The SM valve 18 has a structure such that, in the closed state, pressure on the W/C 41FR, 41RL side is allowed to escape when it is grater than a value in which the pressure on the M/C 10 side plus a cracking pressure of a spring of the check valve. A check valve 181 is provided in parallel in the SM valve 18, and only allows a flow from the M/C 10 side to the W/C 41FR, 41RL side. A reservoir 16 is connected between the M/C 10 and the SM valve 18 by a suction conduit 13.

A hydraulic pressure sensor 30 is provided between the M/C 10 and the SM valve 18 of the first brake system 11, and detects of brake fluid pressure generated by the M/C 10. The brake fluid pressure detected by the hydraulic pressure sensor 30 is pressure generated in a secondary chamber (not shown) of the M/C 10. However, an identical pressure is also generated in a primary chamber connected with the second brake system 21. Therefore, a M/C pressure can be practically detected by the hydraulic pressure sensor 30.

In addition, hydraulic pressure sensors 19a, 19b are provided between the pressure increase control valves 14a, 14b and the W/Cs 41FR, 41RL, and are capable of detecting respective W/C pressures.

Output signals from the hydraulic pressure sensor 30 and the hydraulic pressure sensors 19a, 19b are input to the brake control ECU 1.

The above pressure increase control valves 14a, 14b and the pressure decrease control valves 15a, 15b are two position valves. At times when a solenoid thereof is de-energized (an OFF state), such as when the brake pedal is not operated and during normal braking, the valves are set to the valve positions shown in the figure. Namely, the pressure increase control valves 14a, 14b are open, and the pressure decrease control valves 15a, 15b are closed. In addition, the SM valve 18 is also set to the valve position shown in the figure, i.e., open state, during de-energized state.

The respective control valves are driven by operation signals from the brake control ECU 1. Furthermore, the motor 20 for driving pumps 17, 27 is also driven by an operation signal from the brake control ECU 1.

Next, a basic control method for the hydraulic brake device 2 will now be described.

During a normal braking operation when the driver depresses the brake pedal, all the control valves (the SM valve 18, the pressure increase control valve 14a, and the pressure decrease valve 15a) are set to a de-energized (OFF) state. For this reason, the M/C pressure acts on the W/Cs 41FR, 41RL, and W/C pressure=M/C pressure without change.

During the ABS control, operations differ regarding the process for decreasing the W/C pressure in order to avoid tire lock and the process for increasing the W/C pressure in order to recover braking force. Note that the SM valve 18 is normally OFF (open) during the ABS control, and the pump 17 is driven to suck brake fluid from the reservoir 16.

First, in the pressure-decreasing process of the ABS control, the pressure increase control valve 14a is set to an energized state (ON), i.e., closed. Regarding the pressure decrease control valve 15a, an ON/OFF duty ratio thereof is controlled. Switching between open and closed positions is thus repeated such that brake fluid flows from the W/C 41FR to the reservoir 16, whereby the W/C pressure is decreased at a predetermined change gradient.

In the pressure-increasing process of the ABS control, the pressure decrease control valve 15a is set to a de-energizing state (OFF), i.e., closed state. Regarding the pressure increase control valve 14a, an OFF/ON duty ratio thereof is controlled. Switching between open and closed positions is thus repeated such that brake fluid from the M/C 10 is supplied to the W/C 41RL, whereby the W/C pressure is increased.

During the parking assist control, the brake control ECU 1 instructs the hydraulic brake device 2 based upon a braking request signal from the parking assist control ECU 8. Consequently, a desired W/C pressure is generated for the respective vehicle wheels 4FL to 4RR.

More specifically, when the W/C pressure is increased during the parking assist control, the SM valve 18 is ON and the pressure decrease control valve 15a is OFF. Additionally, the pump 17 is driven to suck brake fluid from the reservoir 16 to generate discharge pressure. Under this state, the W/C pressure is increased at a predetermined change gradient through the OFF/ON duty ratio control of the pressure increase control valve 14a or until a set target pressure is reached; the W/C pressure being compared to a detected value of the hydraulic sensor 19a at the same time. In this case, brake fluid is delivered to the suction port of the pump 17 as necessary from the M/C 10 via the suction conduit 13 and the reservoir 16.

Meanwhile, when the W/C pressure is decreased during the parking assist control, the SM valve 18 is ON and the pressure increase control valve 14a is ON. Additionally, the pump 17 is driven to suck brake fluid from the reservoir 16 to generate discharge pressure. Under this state, brake fluid is withdrawn from the W/C 41FR to decrease the W/C pressure at a predetermined change gradient through the ON/OFF duty ratio control of the pressure decrease control valve 15a or until a set target pressure is reached; the W/C pressure being compared to the detected value of the hydraulic sensor 19a at the same time. Since the pressure increase control valve 14a and the SM valve 18 are both being closed state in this case, the discharge pressure of the pump 17 increases. However, once such pressure exceeds the cracking pressure of the spring in the check valve of the SM valve 18, it is released and the pressure lowers.

Next, the PKB 3 will be described. The PKB 3 is basically driven through operation of a parking brake switch (not shown) by the driver. However, the PKB 3 may be used as appropriate for braking during the parking assist control as well. For this reason, the PKB 3 along with the hydraulic brake device 2 described above also corresponds to a braking force application mechanism.

The PKB 3 is connected to respective brake calipers of the rear wheels 4RL, 4RR via brake wires 31R, 31L. In the PKB 3, an actuator is structured from a motor and a gear mechanism (not shown), and operates according to a control signal from the brake control ECU 1. The actuator generates a braking force, i.e., a second braking force, by driving the brake calipers of the right and left rear wheels 4RR, 4RL via the brake wires 31R, 31L. A motor of the PKB 3 is duty-driven based upon a control signal to normal or reverse rotate. Accordingly, the magnitude of the second braking force can be controlled.

At this time, braking force corresponding to the duty ratio is generated, and the motor of the PKB 3 locks once a target braking force has been reached. After detection of the motor lock, the drive current of the motor is cut, that is, the control signal is canceled and control of the PKB 3 is stopped (control is inhibited). The gear mechanism does not move while control of the PKB 3 is stopped. Thus, the second braking force is maintained and the motor locks.

The PKB 3 is driven by a control signal from the brake control ECU 1 during the parking assist control. In addition to this, the PKB 3 is also driven by a control signal output from the brake control ECU 1, which is based upon an operation signal that is generated in cases of an ON/OFF operation of the parking brake switch (not shown) by the driver.

The vehicle wheel speed sensors 5FL to 5RR, as shown in FIG. 2, are respectively provided in the vehicle wheels 4FL to 4RR so as to enable detection of the rotational speed of the vehicle wheels 4FL to 4RR. Respective output signals of the vehicle wheel speed sensors 5FL to 5RR are directly input to the brake control ECU 1. For the vehicle wheel speed sensors 5FL to 5RR, semiconductor base speed sensors using a Hall element are employed, for example, so as to attain a reliable vehicle wheel rotation pulse even at a low speed. An accurate vehicle speed can thus be detected even a low speed during parking.

The engine control ECU 7 controls engine output by adjusting a fuel injection amount in accordance with a running status and sending a command value to the engine 70. Such control is executed based upon an accelerator opening signal, which is an accelerator operation amount from an accelerator operation amount sensor 52, an engine speed, a water temperature, an oxygen concentration in exhaust, and the like. As a consequence, the driving force to the rotationally-driven right and left front wheels 4FR, 4FL is adjusted via an automatic transmission (AT) 71 and axles 72R, 72L.

Note that the AT 71 is a commonly known apparatus equipped with a torque converter that transmits the rotation of the engine 70 to the axles 72R, 72L. Shift change of the AT 71 is controlled by a control device (not shown). In the present embodiment, the parking assist control is performed through positive use of a condition in which the vehicle is run at a low speed due to a creep phenomenon (hereinafter referred to as "creep running"). However, control of the AT 71 has no particular relation to this, and therefore the control device for the AT 71 will not be described in this specification.

Namely, in the present embodiment, a vehicle VL is run in a low-speed mode by combining two methods for controlling driving force: control of the driving force where the engine control ECU 7 increases the engine output from an idling condition or decreases the engine output toward the idling condition based upon an engine output adjustment signal from the brake control ECU 1; and control of the braking force that is performed by the brake control ECU 1.

The parking assist control ECU 8 corresponds to the vehicle running control device. A request to perform parking assist control is received by the parking assist control ECU 8 via a switch (not shown) for executing parking assist control. Once received, a final target parking position and a motion trajectory toward the target parking position is calculated. At this time, the motion trajectory is calculated as a route along which the vehicle VL does not contact obstacles, with reference to a distance x to an obstacle that is measured by an obstacle sensor 54 (described later) included in the sensors 50.

The vehicle VL is subsequently moved toward the target parking position along the calculated motion trajectory, and the vehicle VL is stopped in the vicinity of the target parking position. Thereafter, a driving force control signal from the parking assist control ECU 8 is output to the brake control ECU 1 such that the vehicle VL moves at an extremely low speed (e.g., 0.1 to 0.2 km/h). As a consequence, the braking force is controlled and the parking assist control is executed such that the vehicle VL reaches the target parking position.

In the parking assist control described above, after the vehicle VL is stopped in the vicinity of the target parking position, the parking assist control ECU 8 calculates the precise distance from that stopped location to the target parking position (e.g., 10 cm). In addition, the parking assist control ECU 8 sets the calculated distance as a distance for which the vehicle VL should be moved, and performs an extremely low speed running control in which the braking force is controlled in order to move the vehicle VL only the distance set as mentioned above (hereinafter referred to as a "set distance"). A driving force already being generated at this time, i.e., the sum of a driving force corresponding to a creep force and a braking force required in consideration of the slope of a road surface where the vehicle VL is to be parked, is a requisite braking force (hereinafter referred to as a "vehicle stop keeping braking force" corresponding to a first braking force) STP for stopping the vehicle VL. Using the vehicle stop keeping braking force STP as a reference, the braking force is varied from the reference so as to move the vehicle VL at an extremely low speed. Note that a detailed description regarding the specific control performed by the parking assist control ECU 8 will follow later in this specification.

The warning device 9 is provided with a warning display unit such as a lamp or a display, and a warning unit such as a buzzer or a speaker. The warning device 9 notifies the driver of the execution of various controls and the like by turning on the lamp, indication on the display, or through a warning sound via the buzzer or the speaker.

The sensors 50 include a steering amount sensor 51, the accelerator operation amount sensor 52, the brake operation amount sensor 53, the obstacle sensor 54, and a gradient sensor 55.

The steering amount sensor 51 detects a steering operation amount of a steering wheel, namely, a steering angle. The accelerator operation amount sensor 52 detects the operation amount of the accelerator pedal, and the brake operation amount sensor 53 detects the operation amount of the brake pedal.

The obstacle sensor 54 is used to detect obstacles around the vehicle VL. Corner sonars, which are provided at a front portion and a rear portion of the vehicle, e.g., a bumper, may be applied to the obstacle sensor 54, measure the distance x to an obstacle present in front or behind the vehicle and sent along with a derivative signal thereof to the brake control ECU 1, the parking assist control ECU 8 and the like via the onboard LAN bus 6. Note that the derivative signal of the distance x corresponds to a velocity relative to obstacles such as a vehicle running in front or behind.

The gradient sensor 55 is configured as a sensor including an acceleration sensor that detects an acceleration in the vehicle longitudinal direction, for example, and is a commonly known mechanism that measures the gradient of the road surface on which the vehicle VL is running or stopped, based upon an acceleration component due to gravity included in the acceleration sensor.

The parking assist control system according to the present embodiment is structured as described above. According to such a structured parking assist control system, once a switch (not shown) for starting the parking assist control is turned ON, the parking assist control is started, and the driver is notified through the warning device 9 that the parking assist control is being executed.

More specifically, based upon detection signals from the vehicle wheel speed sensors 5FL to 5RR, the hydraulic sensors 19a, 19b, 29a, 29b, the sensors 50 and the like, the parking assist control ECU 8 calculates the target parking position and the motion trajectory toward the target position. A braking force control signal is output from the parking assist control ECU 8 to the brake control ECU 1 so that the vehicle VL moves at a desired vehicle speed along the calculated motion trajectory. As a consequence, the braking force is controlled and the parking assist control is executed such that the vehicle VL reaches the target parking position.

During the parking assist control, the extremely low speed running control is executed, which is related to a characterizing portion of the present invention. Namely, the parking assist control ECU 8 executes various processing based upon a flowchart of the extremely low speed running control shown in FIG. 3. Hereinafter, details of the extremely low speed running control will be described with reference to FIG. 3.

First at 100, it is determined whether there is a set distance instruction. The set distance instruction here refers to a distance that is set by the parking assist control ECU 8 after calculating a motion trajectory. More specifically, it is determined whether a distance that the vehicle VL is to be moved based upon a motion trajectory to stop the vehicle at the target parking position, i.e., the set distance described above, has already been set. In the parking assist control ECU 8, for example, the determination at 100 is performed with the setting of a set distance flag when the set distance is already calculated, and determining whether such a set distance flag is set.

In the case of a negative determination at 100, it is assumed that there is no need to run the vehicle VL at an extremely low speed, and the process ends. However, if a positive determination is made at 100, then the routine proceeds to processing at 105.

At 105, a calculation for a braking force slope component is performed. For the braking force slope component, the gradient of a sloped road is calculated based upon a detection signal from the gradient sensor 55 and a braking force corresponding to the sloped road gradient is calculated, or found using a map. For example, in the case of going uphill, a force is applied that moves the vehicle rearward. Therefore, the braking force slope component can be considered a positive braking force (a negative driving force). Conversely, in the case of going downhill, a force is applied that moves the vehicle forward. Therefore, the braking force slope component can be considered a negative braking force (a positive driving force). Such force fluctuates depending on the magnitude of the sloped road gradient. Consequently, the force can be calculated by calculation or a map as a braking force corresponding to the calculated sloped road gradient.

Next, the routine proceeds to processing at 110, and the vehicle stop keeping braking force STP is calculated. A portion among the parking assist control ECU 8 that performs such processing corresponds to a first calculation unit.

It is thus possible to cancel out the driving force corresponding to the currently generated creep force with a braking force that also includes the braking force slope component, thereby keeping the stopped state of the vehicle VL. To this end, the vehicle stop keeping braking force STP is calculated as a sum of the braking force slope component calculated at 105 and the currently generated driving force. At this time, the braking force slope component is added as a positive value in the case of a downhill slope, which increases the value of the vehicle stop keeping braking force STP; but the braking force slope component is added as a negative value in the case of an uphill slope, which decreases the value of the vehicle stop keeping braking force STP.

In other words, a value where the effect of the sloped road gradient on the driving force generated in the vehicle VL is taken into consideration corresponds to a driving force (propulsive force) applied to the vehicle VL in the traveling direction. Therefore, the braking force opposing this driving force is the vehicle stop keeping braking force STP.

Note that the currently generated driving force is generally calculated in the engine control ECU 7, and obtained from the engine control ECU 7 via the onboard LAN bus 6.

Next, the routine proceeds to processing at 115, where it is determined whether the control is being performed for the first time (a first-time control execution). Such a determination of first-time control execution is made based upon whether a flag is set that indicates extremely low speed running control is being performed. If the flag is not yet set, then a first-time control execution is determined (see 120 and 155 described later).

If a first-time control execution, then the routine proceeds to processing at 120. The vehicle stop keeping braking force STP calculated at 110 is then set as a reference braking force, and the routine proceeds to processing at 125. In addition, at this time, the flag is set that indicates the extremely low speed running control is being performed.

At 125, in a case where it is assumed that braking force will be applied to stop the vehicle VL, it is determined whether a distance required after a set distance instruction is generated until the vehicle VL is stopped (hereinafter referred to as a "final moving distance") is less than the set distance. More specifically, the final moving distance is calculated to add a current moved distance since generation of the set distance instruction and a value multiplied a current vehicle speed (an extremely low speed) by a dead time Tend that corresponds to a hardware response delay. Note that a braking distance in order to stop the vehicle VL once the braking force has been applied can be practically ignored since the vehicle VL is moving at an extremely low speed.

If a positive determination is made here, then it is assumed that the vehicle VL will not move the entire set distance, and the routine proceeds to processing at 130.

At 130, a requisite braking force is calculated. A portion among the parking assist control ECU 8 that performs such processing corresponds to a braking torque application unit.

Namely, the requisite braking force is calculated as a value in which an oscillating braking force (an amplitude parameter of the braking force) S(t), whose magnitude cyclically varies by a time t, is added to the reference braking force.

The oscillating braking force will be explained here. The vehicle VL starts to move when a braking force being applied to the stopped vehicle VL is gradually lowered, and the braking force becomes smaller than that required to maintain an equilibrium with the driving force, i.e., when the braking force becomes smaller than the vehicle stop keeping braking force STP. In order to ensure that the vehicle VL moves at an extremely low speed at this time, the braking force should be made slightly smaller than a point of equilibrium between the braking force and the driving force. However, it is difficult to control the braking force in such a manner.

For instance, during feedback to indicate that the vehicle VL has started to move, the vehicle VL may already have moved too much. Therefore, a method is needed to unbalance the equilibrium up to a certain point such that the vehicle VL will reliably move, and then to negate subsequent inertia rapidly to stop the vehicle VL.

In order to achieve this, the present embodiment includes the oscillating braking force in the requisite braking force. In other words, the oscillating braking force can be used to increase the braking force in short cycles. Thus, the braking force can be forcibly increased to ensure that there is no further excessive lowering of the braking force when the braking force becomes smaller than that required to maintain an equilibrium with the driving force. Therefore, the oscillating braking force is used such that the vehicle speed does not exceed an extremely low speed when the vehicle VL starts to move.

However, it should be noted that using an excessive large amplitude will come out in the vehicle behavior and may give the driver a sense of discomfort. Therefore, an appropriate amplitude should be used to reliably move the vehicle VL and thereafter reliably stops the vehicle VL. Accordingly, it is possible to adjust an amplitude gain, for example, based upon a weight on a suspension or longitudinal and lateral spring constants of the suspension of the vehicle VL, in order to achieve appropriate adjustment in line with the driver's expectations.

In addition, the moving distance of the vehicle VL varied depending on the amplitude magnitude. Therefore, the amplitude magnitude may be adjusted in accordance with the moving distance of the vehicle VL within a unit of time that is set beforehand (a set time). For instance, if the vehicle VL moves a large distance within the set time, which indicates that the movement of the vehicle VL is fast, then the amplitude may be set small in this case.

With regard to the amplitude cycle as well, if the cycle is set too long, then the vehicle VL may move a large amount in one cycle. Therefore, the amplitude cycle must be set to a sufficiently small value to ensure that the vehicle VL moves only a minute distance for each cycle.

However, it is also possible to intentionally increase the amplitude gain to warn the driver during the execution of extremely low speed control, such as when the vehicle is approaching an obstacle during the parking assist control.

In this manner, the requisite braking force that includes the oscillating braking force is transmitted to the brake control ECU 1 as a braking force control signal. Thereafter, the routine returns to 105 again, where the processing described above is repeated. However, this time, a negative determination is made at 115.

Accordingly, the routine proceeds to processing at 135, where it is determined whether the moving distance within the set time is less than a predetermined value A (a first predetermined value). The moving distance within the set time as used here means how much the vehicle VL has moved within the set time that was set beforehand, and is used as a parameter representing a moving speed of the vehicle VL. A portion among the parking assist control ECU 8 that performs such processing at 135 and at 145 (described later) corresponds to a detection unit.

If the moving speed of the vehicle VL is less than an extremely low speed, such as when the vehicle VL has not yet started moving, then a positive determination is made at 135.

If a positive determination is made at 135, then the routine proceeds to processing at 140. At 140, the reference braking force is calculated by subtracting a set value from the previously calculated reference braking force. The routine subsequently proceeds to processing at 125 and onward. A positive determination is made at 125 if the vehicle VL has not yet started moving, and therefore a requisite braking force that is smaller than the previously calculated requisite braking force is calculated at 130. This processing is repeated until the vehicle VL starts moving, and the requisite braking force gradually becomes smaller.

Thus, the reference braking force is set such that the difference between the driving force of the vehicle VL and the braking force applied to the vehicle wheels 4FL to 4RR increases. Accordingly, the driving force becomes larger than the braking force applied to the vehicle wheels 4FL to 4RR, thereby making it easier for the vehicle VL to start moving.

Meanwhile, if the vehicle VL starts to move and the moving speed thereof is an anticipated extremely low speed, then a negative determination is made at 135. The routine then proceeds to processing at 145, where this time it is determined whether the moving distance within the set time exceeds a predetermined value B (a second predetermined value).

The predetermined value B is set as a value greater than the predetermined value A. In other words, if the moving distance within the set time exceeds the predetermined value B. this indicates that the moving speed of the vehicle VL is faster than what can be considered an extremely low speed. Accordingly, a vehicle speed within the range of the predetermined values A and B is defined as an extremely low speed range.

Therefore, if a positive determination is made at 145, then the routine proceeds to processing at 150 in order to apply a braking force and lower the moving speed of the vehicle VL. Following an increase to the reference braking force by adding a set value to the previously calculated reference braking force, the routine proceeds to processing at 125 and onward. Conversely, if a negative determination is made, then the moving speed of the vehicle VL is the anticipated extremely low speed. It is thus assumed that there is no need to increase or decrease the braking force, and the routine proceeds without further action to processing at 125 and onward.

Thus, the reference braking force is set such that the difference between the driving force of the vehicle VL and the braking force applied to the vehicle wheels 4FL to 4RR decreases. This in turn ensures that the vehicle VL does not move excessively.

The processing described above is repeated to control the moving speed such that the vehicle VL moves at an extremely low speed. As the moving distance of the vehicle VL gradually increases, it becomes possible for the vehicle VL to move the entire set distance and a negative determination is made at 125. Accordingly, the routine proceeds to processing at 155, where it is determined whether the requisite braking force is equal to or less than the vehicle stop keeping braking force STP. If a positive determination is made here, then it is assumed that the vehicle VL can be stopped without further action and that the stopped state can be kept. The routine subsequently ends. In addition, the flag is reset that indicates the extremely low speed running control is being performed. Conversely, if a negative determination is made, then the routine proceeds to processing at 160. At 160, the requisite braking force is increased by adding a set value to the previously calculated reference braking force, thereby ultimately stopping the vehicle VL.

Figure 4:
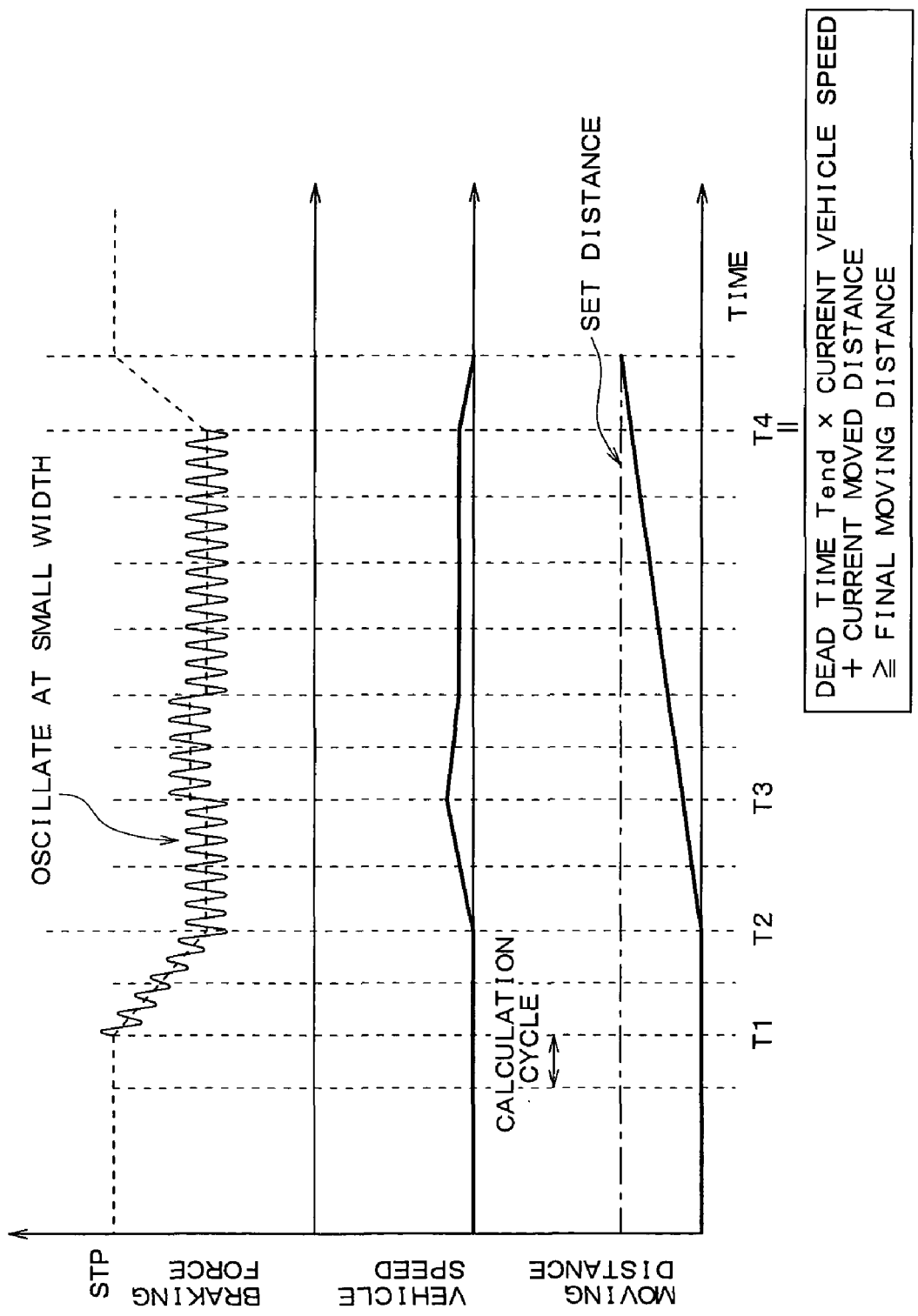
FIG. 4 is a timing chart showing a case in which the extremely low speed running control shown in FIG. 3 is performed.

Hence, extremely low speed running processing is performed as explained above. FIG. 4 shows a timing chart when such extremely low speed running control is performed. Specific operations when the extremely low speed running processing is performed will be described with reference to FIG. 4.

First, a set distance is determined when the vehicle VL is stopped (time period T1), and the braking force is gradually decreased. At this time, the oscillating braking force is included in the requisite braking force. Therefore, regardless of the vehicle VL starting to move due to the decrease in braking force, there is no risk of the moving speed of the vehicle VL rapidly increasing and leading to excessive movement of the vehicle VL.

Next, once the vehicle VL has started to move (time period T2), the requisite braking force (including the oscillating braking force) is maintained to a predetermined value. After the moving speed of the vehicle VL exceeds the extremely low speed and the moving distance within the set time exceeds the predetermined value A, the reference braking force is set by subtracting a set value from the previously calculated reference braking force. Accordingly, the requisite braking force is decreased (time period T3).

Thereafter, the requisite braking force is adjusted as appropriate. If a sum of a value, in which the dead time Tend is multiplied by the vehicle speed at that time, and the moving distance from the stopped location of the vehicle VL is equal to or greater than the set distance, then the requisite braking force is gradually increased (time period T4). When the vehicle VL is finally stopped, a requisite braking force equal to or greater than the vehicle stop keeping braking force STP is output so that the vehicle VL remains stopped.

As explained above, in the parking assist control system according to the present embodiment, a set distance is determined as a distance from a stopped position of the vehicle VL to a target parking position. A requisite braking force that includes an oscillating braking force is then gradually lowered so as to move the vehicle VL.

Accordingly, it is possible to run at an extremely low speed the vehicle VL that runs based upon engine driving force, regardless of whether a motor is provided.

In addition, when it is determined that the moving distance of the vehicle VL will reach the set distance, including the moving distance generated by the dead time Tend that corresponds to a hardware response delay, the requisite braking force is gradually increased in order to stop the vehicle VL.

Accordingly, it is possible to precisely move the vehicle VL only the set distance. The vehicle VL can thus be accurately moved into the target parking position.

Second Embodiment

A second embodiment of the present invention will be described. In the above first embodiment, the braking force is adjusted in order to unbalance the equilibrium between the braking force and the driving force generated in the vehicle VL, which in turn enables the vehicle VL to be moved only the set distance. However, in the second embodiment, the driving force is adjusted in order to achieve the same operation and effects as the first embodiment. Note that the only difference in the present embodiment is processing performed by the parking assist control ECU 8. The parking assist control system is identical to that in the first embodiment, and therefore, only portions that differ will be described.

In the present embodiment as well, upon receiving a request to perform parking assist control, the parking assist control ECU 8 calculates the final target parking position and the motion trajectory toward the target parking position, and performs the parking assist control. In the present embodiment, however, the vehicle VL is stopped before the target parking position, after which the set distance is calculated and the vehicle VL is moved at an extremely low speed. At this time, a driving force control signal is output from the parking assist control ECU 8 to the engine control ECU 7 in order to control a driving torque, namely, a driving force, such that the vehicle VL reaches the target parking position.

Figure 5:
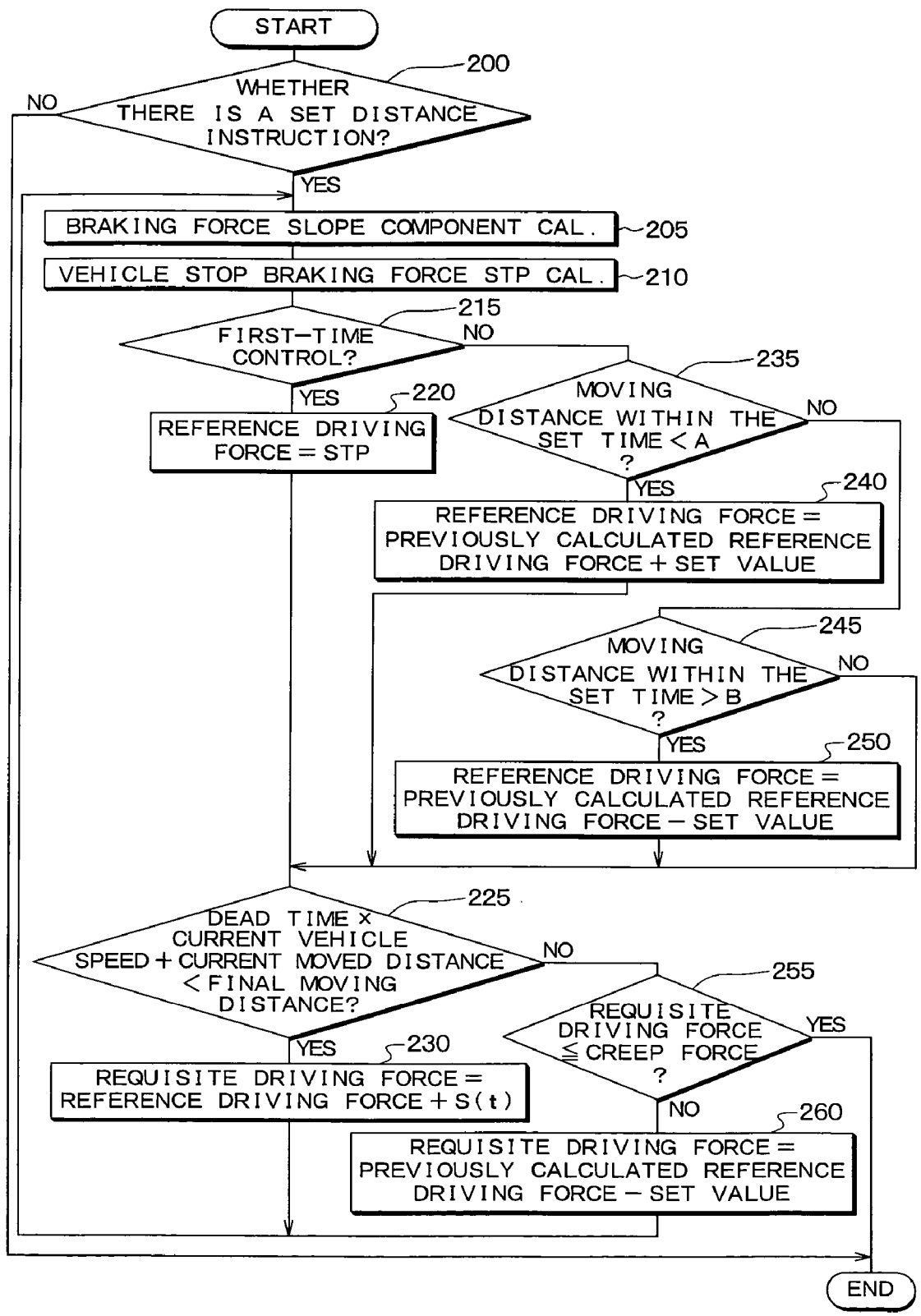
FIG. 5 is a flowchart of an extremely low speed running control shown in a second embodiment of the present invention.

FIG. 5 is a flowchart of extremely low speed running control. Hereinafter, details of the extremely low speed running control will be described with reference to FIG. 5. However, the extremely low speed running control is essentially identical to the extremely low speed running control of the first embodiment shown in FIG. 3, and descriptions for like portions will therefore be omitted.

Figure 3:
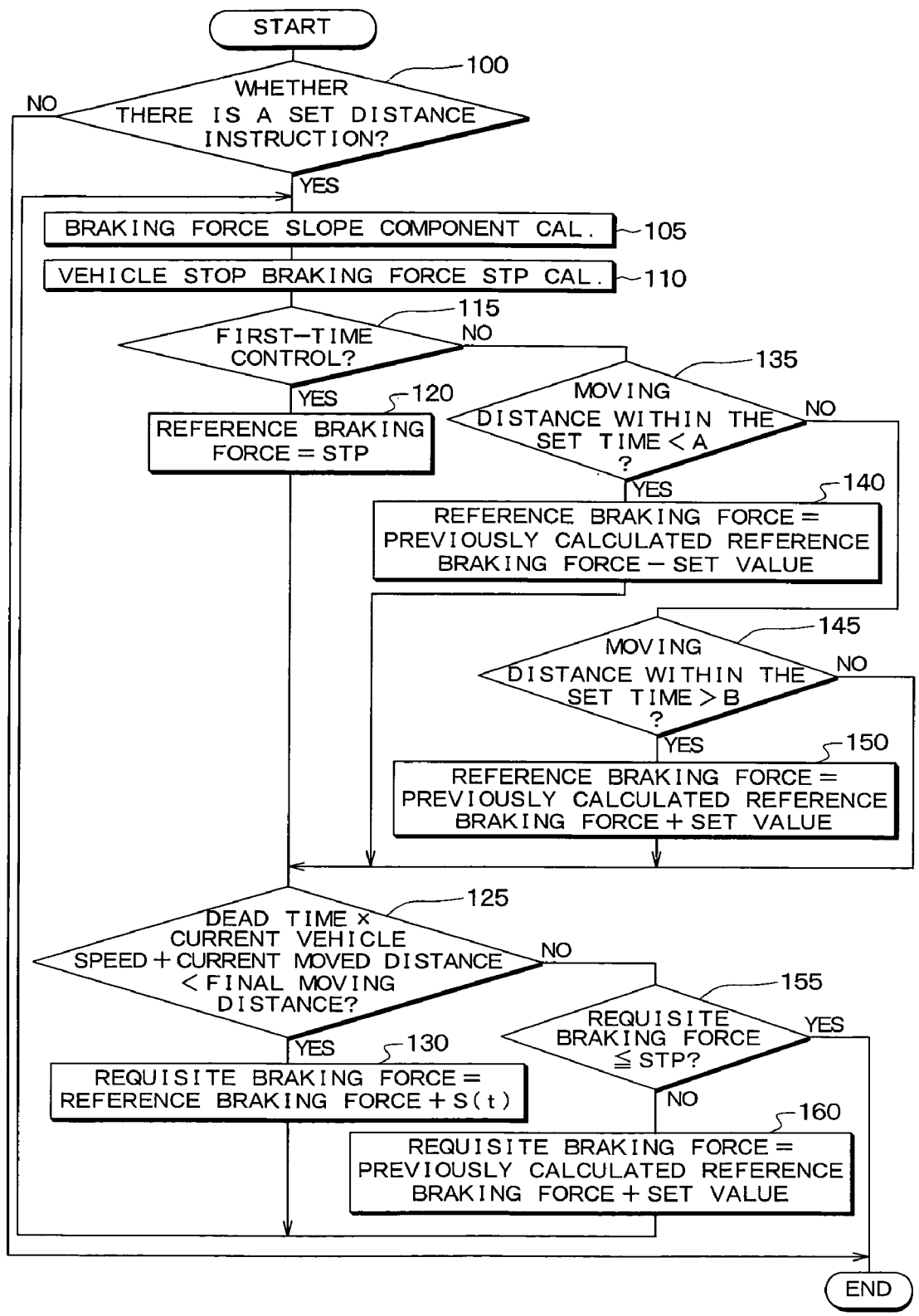
FIG. 3 is a flowchart of an extremely low speed running control.

First, at 200 to 215, processing identical to that in 100 to 115 of FIG. 3 is executed. If a first-time control execution is determined at 215, then the routine proceeds to processing at 220. A driving force corresponding to an amount of creep force currently being generated is set as a reference driving force, and the routine proceeds to processing at 225. Also at this time, the flag is set that indicates extremely low speed running control is being performed.

At 225, processing identical to that at 125 of FIG. 3 is executed. If a positive determination is made here, then it is assumed that the vehicle VL will not move the entire set distance yet, and the routine proceeds to processing at 230.

At 230, a requisite driving force is calculated. Namely, the requisite driving force is calculated as a value in which an oscillating driving force (an amplitude parameter of the driving force), whose magnitude cyclically varies by the time t, is added to the reference driving force.

The oscillating driving force used here corresponds to the oscillating braking force explained in the first embodiment, except that the braking force is replaced by a driving force. The oscillating driving force fulfills the same role as the oscillating braking force.

In this manner, the requisite driving force that includes the oscillating driving force is transmitted to the engine control ECU 7 as a driving force control signal. Thereafter, the routine returns to 205 again, where the processing described above is repeated. However, this time, a negative determination is made at 215.

Accordingly, the routine proceeds to processing at 235, where it is determined whether the moving distance within the set time is less than the predetermined value A, similar to processing at 135 in FIG. 3. If the moving speed of the vehicle VL is less than an extremely low speed at this time, such as when the vehicle VL has not yet started moving, then a positive determination is made at 235.

If a positive determination is made at 235, then the routine proceeds to processing at 240. At 240, the reference driving force is calculated by adding a set value to the previously calculated reference driving force. The routine subsequently proceeds to processing at 225 and onward. A positive determination is made at 225 if the vehicle VL has not yet started moving, and therefore a requisite driving force that is larger than the previously calculated requisite driving force is calculated at 230. This processing is repeated until the vehicle VL starts moving, and the requisite driving force gradually becomes larger.

Meanwhile, if the vehicle VL starts to move and the moving speed thereof is the anticipated extremely low speed, then a negative determination is made at 235. The routine then proceeds to processing at 245, where this time it is determined whether the moving distance within the set time exceeds the predetermined value B, similar to processing at 145 in FIG. 3.

If a positive determination is made at 245, then the routine proceeds to processing at 250 in order to reduce a driving force and lower the moving speed of the vehicle VL. Following a decrease in the reference driving force by subtracting a set value from the previously calculated reference driving force, the routine proceeds to processing at 225 and onward. Conversely, if a negative determination is made, then the moving speed of the vehicle VL is the anticipated extremely low speed. It is thus assumed that there is no need to increase or decrease the driving force, and the routine proceeds without further action to processing at 225 and onward.

Thus, the moving speed is controlled such that the vehicle VL moves at an extremely low speed. As the moving distance of the vehicle VL gradually increases, it becomes possible for the vehicle VL to move the entire set distance and a negative determination is made at 225. Accordingly, the routine proceeds to processing at 255, where it is determined whether the requisite driving force is equal to or less than the creep force.

If a positive determination is made here, then it is assumed that the vehicle VL can be stopped without further action and that the stopped state can be kept. The routine subsequently ends. Conversely, if a negative determination is made, then the routine proceeds to processing at 260. At 260, the requisite driving force is decreased by subtracting a set value from the previously calculated reference driving force, thereby ultimately stopping the vehicle VL.

Figure 6:
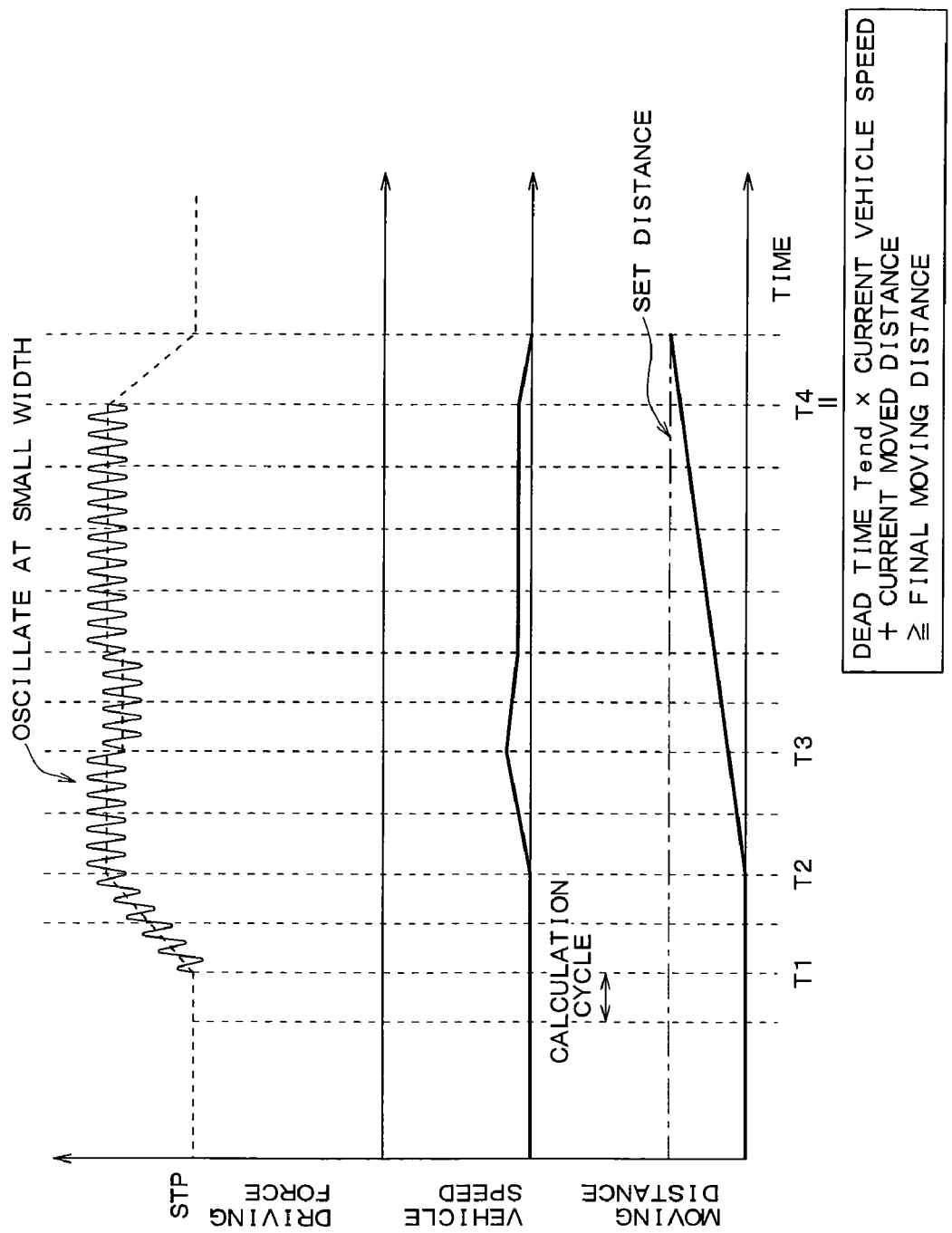
FIG. 6 is a timing chart showing a case in which the extremely low speed running control shown in FIG. 5 is performed.

Hence, extremely low speed running processing is performed as explained above. FIG. 6 shows a timing chart for when such extremely low speed running control is performed. Specific operations when the extremely low speed running processing is performed will be described with reference to FIG. 6.

First, a set distance is determined when the vehicle VL is stopped (time period T1), and the driving force is gradually increased. At this time, the oscillating driving force is included in the requisite driving force. Therefore, regardless of the vehicle VL starting to move due to the increase in driving force, there is no risk of the moving speed of the vehicle VL rapidly increasing and leading to excessive movement of the vehicle VL.

Next, once the vehicle VL has started to move (time period T2), the requisite driving force (including the oscillating driving force) is maintained to a predetermined value. After the moving speed of the vehicle VL exceeds the extremely low speed and the moving distance within the set time exceeds the predetermined value A, the reference driving force is set by subtracting a set value from the previously calculated reference driving force. Accordingly, the requisite driving force is decreased (time period T3).

Thereafter, the requisite driving force is adjusted as appropriate. If a sum of a value, in which the dead time Tend is multiplied by the vehicle speed at that time, and the moving distance from the stopped location of the vehicle VL is equal to or greater than the set distance, then the requisite driving force is gradually decreased (time period T4). When the vehicle VL is finally stopped, a requisite driving force equal to or less than the creep force is output so that the vehicle VL remains stopped.

As explained above, in the present embodiment, a requisite driving force that includes an oscillating driving force is gradually raised so as to move the vehicle VL, instead of lowering the braking force. It is thus possible to obtain the same effects as the first embodiment through such adjustment of the driving force.

Other Embodiments

In the first embodiment, the vehicle VL is moved at an extremely low speed by adjusting only a braking force that is an example of a braking torque, i.e., a control torque. In the second embodiment, the vehicle is moved at an extremely low speed by adjusting only a driving force that is an example of a driving torque, i.e., a control torque. However, it is also possible to move the vehicle VL at an extremely low speed through coordinated adjustment of both the braking force and the driving force.

Also, in order to move the vehicle VL at an extremely low speed in the above embodiments, a reference braking force that corresponds to a first control torque is varied so as to vary a requisite braking force that corresponds to a second control torque. However, this is but a mere example; the second control torque may be varied by varying either the first control torque or a third control torque as an oscillating control torque such as the oscillating driving force.

While the above description is of the preferred embodiments of the present invention, it should be appreciated that the invention may be modified, altered, or varied without deviating from the scope and fair meaning of the following claims.

What is claimed is:

1. A running control device for a vehicle having wheels in order to move the vehicle from a stopped state, the running control device comprising:
    a first calculation unit that calculates a driving force to be applied to the vehicle wheels in a traveling direction of the vehicle and calculates a first braking force, which is a vehicle stop keeping braking force and which is applied to the vehicle wheels in order to keep the vehicle stopped by negating the driving force;
    a detection unit that detects a vehicle speed; and
    a second calculation unit that calculates a first control torque, which corresponds to the first braking force;
    a torque application unit that applies a second control torque, which is calculated by adding a third control torque that oscillates every predetermined cycle to the first control torque, such that the driving force becomes relatively greater than a second braking force applied to the vehicle wheels and the vehicle moves in the traveling direction, wherein
    the second calculation unit varies the second control torque when the vehicle is moved by an application of the second control torque, by varying at least one of the first control torque and the third control torque based upon the vehicle speed calculated by the detection unit, such that the vehicle speed is within a predetermined speed range in the absence of any braking operation performed by a driver.

2. The vehicle running control device according to claim 1, wherein
    the detection unit calculates a moving distance of the vehicle within a set time that is set beforehand for detecting the vehicle speed, and
    the second calculation unit varies the first control torque so as to increase a difference between the driving force and the second braking force applied to the vehicle wheels if the moving distance of the vehicle within the set time calculated by the detection unit is less than a first predetermined value, and varies the first control torque so as to decrease a difference between the driving force and the second braking force applied to the vehicle wheels if the moving distance exceeds a second predetermined value that is greater than the first predetermined value.

3. The vehicle running control device according to claim 1, wherein the torque application unit decreases an amplitude of the third control torque in accordance with increases in a moving distance of the vehicle within a set time calculated by the detection unit.

4. The vehicle running control device according to claim 1, further comprising:
    an instruction unit for determining a set distance that indicates how far to move the vehicle from a stopped location of the vehicle, wherein the second calculation unit varies the first control torque so as to stop the vehicle at the set distance determined by the instruction unit.

5. The vehicle running control device according to claim 4, wherein the second calculation unit calculates a sum of a value in which the vehicle speed detected by the detection unit is multiplied by a predetermined time, and a moving distance from the stopped location of the vehicle calculated based upon the vehicle speed detected by the detection unit, and the first control torque is gradually increased in order to stop the vehicle when the sum is equal to or greater than the set distance.

6. The vehicle running control device according to claim 1, wherein the first control torque, the second control torque, and the third control torque are braking torques, and the torque application unit decreases a required braking torque acting as the second control torque, such that the driving force becomes relatively greater than the second braking force applied to the vehicle wheels.

7. The vehicle running control device according to claim 1, wherein the first control torque, the second control torque, and the third control torque are driving torques, and the torque application unit increases a required driving torque acting as the second control torque, such that the driving force becomes relatively greater than the second braking force applied to the vehicle wheels.

* * * * *